Patented Aug. 30, 1938

2,128,850

UNITED STATES PATENT OFFICE 2,128,850

BAKED PEANUTS AND METHOD OF PREPARATION

Harold S. Richards, South Portland, Maine

No Drawing. Application March 4, 1936, Serial No. 67,073

3 Claims. (Cl. 99—98)

This invention is concerned with a new food product, baked peanuts, and comprises the product, a method of preparing and baking peanuts, and a method of canning the baked product for preservation and commercial distribution and sale.

I have discovered that peanuts when suitably prepared and baked constitute a food which is at the same time palatable, having a distinctive flavor unlike roasted peanuts or any other food article with which I am acquainted, nutritious, and easily digested, being far more readily digestible than roasted peanuts. However, to obtain these effects, the bitter principle or essence contained in the skins of the peanut kernels should be removed and the oil content largely retained. My discovery and invention include a method of treatment which accomplishes these ends and for which I claim protection by itself as well as in combination with other features of the complete process.

In carrying the invention into effect the first step is to eliminate the bitter essence contained in the peanut skins. This is accomplished by soaking the shelled peanuts in water; preferably water made somewhat saline by addition of common salt. Both the length of the soaking period and its effect vary with the condition of the nuts, i. e., whether they are freshly harvested or have been stored for an extended time. The new or recently harvested nuts are more moist than old nuts and their skins cling more tightly. The range of soaking time varies therefore from one to eight hours according to the age of the nuts. One hour is the shortest time in which the desired effect can be obtained, and usually three hours or more are required. The longer limit is established by the capacity of the nuts to absorb water. That is, they should not be allowed to absorb so much water as to saturate them and hence prevent them from absorbing the flavoring substances by which they are afterwards surrounded during the baking step. In my experience I have found that eight hours is sufficient for the oldest peanuts which are suitable for food and should not be exceeded if the best final results are to be obtained. However, it would not be a departure from the protection which I claim to soak the peanuts for longer than eight hours.

The effect of soaking is to cause the peanuts to swell. In the case of new and relatively moist nuts, of which the skins are more flexible and tightly adherent, the skins usually do not separate from the kernels but stretch with the swollen kernels. The bitter essence and coloring matter are leached from the skins, leaving them substantially tasteless, colorless and transparent. With older nuts, which have become more or less dried out since harvesting, the skins usually burst and separate from the kernels. Agitation helps to effect this separation and is desirable. It may be performed by a hand manipulated paddle or a mechanical agitator, and is preferably carried on gently in order not to separate the halves of the kernels from one another. A few minutes of such agitation is sufficient to dislodge all skins which will come off. It is performed of course near the end of the soaking period. The detached skins float to the surface of the water in which the kernels are immersed, and may be skimmed off.

In carrying out the soaking step, the shelled nuts are submerged in a sufficient excess of water to insure their continued submergence after swelling. The water also separates bad from good nuts, as the specific gravity of sound nuts is slightly greater than that of water and of bad nuts is slightly less. The water may be either hot or cold at the beginning, and it may be continuously heated or allowed to come to room temperature during the soaking period. The use of hot water simply shortens the time needed to soften the kernels and leach the skins or cause them to separate.

A small content of salt in the soaking water is important and valuable as a means for preventing loss of oil from the nuts. While fresh water will produce the effects above described on the skins, it also has the undesirable effect of causing a considerable portion of the natural content of oil to leave the kernels. This loss of oil is largely prevented by making the water saline. The proportion of salt dissolved in the water for this purpose may be anything from 1% to 6% or 7%. A greater salt content than 7% is not desirable, as it makes the specific gravity of the solution as great as that of sound peanuts, causing them to float and sacrificing the flotation separation between good and bad nuts.

After soaking for a sufficient time as before described, the peanuts are placed in baking pots (preferably earthenware pots or crocks), and covered with water. Flavoring material is added at this time; and as flavoring I prefer molasses, brown sugar, table salt and mustard in quantities approximately as follows, based on 100 pounds of the raw peanuts prior to soaking:

Molasses _____quarts__ 3½
Brown sugar_____pounds__ 6
Fine table salt_____pounds__ 2
Mustard _____ounces__ 6

However, other or additional flavoring materials may be used according to the taste of the baker or of the consumers for whom the product is made. The flavoring materials are mixed and dissolved thoroughly in hot water before being placed in the baking pots, in order to insure a thorough and uniform distribution among the peanuts.

The pots are then placed in an oven and their contents slowly baked. The baking time and temperature may range between six hours at an oven temperature of about 450° F., and twelve hours at a temperature of about 350° F. Water may be added from time to time to any extent necessary to prevent the peanuts from drying and being carbonized. Generally the product is more palatable and attractive in appearance when baked for the longer periods at the lower temperatures. It is to be understood, however, that the times and temperatures above named are not exact limits but may be varied somewhat in either direction within the scope of protection which I claim.

The product of the baking step may be canned for preservation and commercial distribution. This final step is a factor for which I claim protection in combination with the steps previously described. It is effected by placing the baked peanuts in cans while still hot and at a temperature preferably in the neighborhood of 200° F. and at least above 140° F. The filled cans are sealed, and then sterilized by being subjected to the heat of live steam in a retort at a temperature of approximately 240° F. for a period of approximately 90 minutes. Then the cans are immediately cooled by immersion in, or spraying with, cold water for about fifteen minutes, or until the average temperature of the cans and their contents has diminished to about 85° F.; after which they are placed in an open, cool room at moderate temperature, and left to be further cooled by conduction to the surrounding air. The air may be circulated to hasten this final cooling, but such circulation is not necessary, since the product after sterilization is in a condition of preservation which will withstand wide variations of temperature for an indefinite time.

Any species and grades of peanuts may be thus prepared. However, I prefer those which have the smallest kernels because, after the inevitable increase in bulk which results from soaking, the smaller peanuts are more attractive in appearance than those of the larger sizes. All grades are substantially equal in palatability, digestibility and nutritive value.

What I claim and desire to secure by Letters Patent is:

1. The method of producing baked peanuts which comprises soaking shelled raw peanuts in water for a sufficient length of time to swell the nut kernels and remove their bitter tasting constituent, separating the nuts from the soaking water, placing the nuts in a baking pot with water and flavoring material, and subjecting the pot and its contents to heat at a temperature between 450° F. and 350° F. for a period of time between six hours and twelve hours respectively.

2. The method of producing baked peanuts which comprises soaking shelled raw peanuts in water for a long enough time to extract the bitter essence and coloring matter from the peanut skins, or to cause separation of the skins from the kernels, discarding the separated skins and water, placing the nut kernels with water and flavoring material in a baking pot, and subjecting the pot and its contents to heat at a temperature between 450° F. and 350° F. for a period of time between six hours and twelve hours respectively.

3. The method of producing baked peanuts which comprises immersing shelled raw peanuts in water containing a dissolved content of common salt sufficient to oppose loss of oil from the peanuts by soaking, but insufficient to increase the specific gravity of the water to an equality with that of sound peanuts, leaving the nuts in the water for a sufficient time to cause them to swell and to extract the bitter essence from the skins of newly harvested nuts and release the skins of older nuts, separating the nut kernels from the water and released skins, placing such kernels in a baking pot with water and flavoring material, and subjecting the pot and its contents to heat at a temperature between 450° F. and 350° F. for a period of time between six hours and twelve hours respectively.

HAROLD S. RICHARDS.